UNITED STATES PATENT OFFICE.

ARTHUR RICHARD COULSON, OF SAN QUENTIN, CALIFORNIA.

COMPOSITION OF DRIED MODIFIED CULTURED MILK POWDER TO BE USED IN COOKING AND BAKING HUMAN FOODS.

1,374,138. Specification of Letters Patent. Patented Apr. 5, 1921.

No Drawing. Application filed July 1, 1920. Serial No. 393,231.

*To all whom it may concern:*

Be it known that I, ARTHUR RICHARD COULSON, a citizen of the United States, residing at San Quentin, in the county of Marin, State of California, have invented a new and useful Composition of Dried Modified Cultured Milk Powder to be Used in Cooking and Baking Human Foods, of which the following is a specification.

The object of my invention is the production of a dried modified cultured milk powder which may be used in conjunction with other foods in cooking, baking and preparing edibles for human consumption. This modified cultured milk powder added to other foods, enriches them by increasing the nutritive value, and saves on the amount of milk and eggs otherwise necessary in many food products.

In manufacturing modified cultured milk powder I take fresh skimmed milk and add to it a little sugar, about one pound of sugar to twenty (20) gallons of milk. I then add a little lactic acid bacteria culture in the form of clabbered milk, which is called sour milk starter. The milk is then allowed to stand about ten (10) hours, or a little longer, preferably in a dark room where the temperature is kept at about seventy-five (75) to eighty (80) degrees Fahrenheit. Then a solution of rennet is added, about two (2) tablespoons full to one hundred (100) gallons of sour milk, and it is then allowed to stand for one (1) to two (2) hours longer. The milk is curdled before it has a chance to become rancid or bitter in taste.

When the milk has developed a good percentage of lactic acid, and has a good curd-like appearance then a little bicarbonate of soda is added; about six ounces of bicarbonate of soda to one hundred (100) gallons of cultured milk. The milk is then stirred up or agitated to mix the soda through the milk evenly.

Next I take buttermilk which has been salted with approximately one and one half (1½) pounds of salt to one hundred (100) gallons of buttermilk, and stir this buttermilk in with the curded skim milk, adding any where from forty (40) to one hundred (100) gallons of buttermilk to each one hundred (100) gallons of the prepared skim milk.

The mixture is then evaporated or condensed down to a thick batter. At this stage I may add either the beaten whites or yolks of eggs, or both whites and yolks of eggs may be stirred in with the condensed modified cultured milk mixture and then the drying process completed at a mild temperature until sufficiently dry to grind into powder.

It is not necessary to add the eggs to the modified cultured milk product, but it may be done where it is desired to have the product used as a sort of an egg substitute or in preparing cooked or baked foods, where the solids of eggs are beneficial to the betterment of the product.

Having thus described my invention and process for making same, I claim:

A dried modified cultured milk powder to be used in baking and cooking foods for human consumption, consisting of the solids of a modified cultured milk mixture comprising sweetened curdled skim milk, fifty (50) to eighty (80) per cent., and salted buttermilk twenty (20) to fifty (50) per cent., said solids being the residue that is left after the modified cultured milk mixture is dried.

ARTHUR RICHARD COULSON.

Witnesses:
H. E. SMITH,
M. CLARK.